United States Patent
Raghavendra et al.

(10) Patent No.: US 11,983,222 B2
(45) Date of Patent: *May 14, 2024

(54) HANDLING OUT-OF-ORDER DATA DURING STREAM PROCESSING AND PERSISTING IT IN A TEMPORAL GRAPH DATABASE

(71) Applicant: Cisco Technology, Inc., San Jose, CA (US)

(72) Inventors: Arun Kumar Raghavendra, Bangalore (IN); Bhalaji Narayanan, Bangalore (IN); Ramesh Nethi, Bangalore (IN); Mehar Simhadri, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,386

(22) Filed: Sep. 19, 2022

(65) Prior Publication Data
US 2023/0008426 A1    Jan. 12, 2023

Related U.S. Application Data

(63) Continuation of application No. 17/077,511, filed on Oct. 22, 2020, now Pat. No. 11,449,551.

(30) Foreign Application Priority Data

Aug. 27, 2020    (IN) .............................. 202041036949

(51) Int. Cl.
*G06F 16/00*    (2019.01)
*G06F 16/23*    (2019.01)
*G06F 16/2455*  (2019.01)
*G06F 16/901*   (2019.01)

(52) U.S. Cl.
CPC ...... *G06F 16/9024* (2019.01); *G06F 16/2379* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 2016/0125095 A1* | 5/2016 | Xu | G06F 16/9024 707/740 |
| 2018/0081943 A1* | 3/2018 | Johnson | G06F 16/2477 |
| 2018/0367414 A1 | 12/2018 | Raghavendra et al. | |
| 2019/0034553 A1* | 1/2019 | Ni | G06F 16/9024 |

* cited by examiner

Primary Examiner — Anhtai V Tran
(74) *Attorney, Agent, or Firm* — Polsinelli P.C.

(57) ABSTRACT

The present technology addresses deficiencies associated with common practices for handling out of order data in a streaming data database. An aspect of the present technology is avoid storing out of order data in a snapshot but just store the out of order data as additional data linked to the temporal graph. The present technology receives out of order data and records a modification time for the data and a next modification time for the data that equals a timestamp of data previously stored in the database. If there is also data in the database for a time earlier than the timestamp of the out of order data, the earlier data is adjusted so that its next modification time matches the timestamp of the out of order data.

20 Claims, 5 Drawing Sheets

HANDLING OUT-OF-ORDER DATA DURING STREAM PROCESSING AND PERSISTING IT IN A TEMPORAL GRAPH DATABASE

CROSS-REFERENCE TO RELATED APPLICATIONS

This application is a continuation of U.S. application Ser. No. 17/077,511, filed on Oct. 22, 2022, entitled, "HANDLING OUT-OF-ORDER DATA DURING STREAM PROCESSING AND PERSISTING IT IN A TEMPORAL GRAPH DATABASE," which in turn, claims priority to Indian application number 202041036949, filed on Aug. 27, 2020, the contents of which are incorporated herein by reference in their entirety.

TECHNICAL FIELD

The present technology pertains to handling out of order data in a network log and, more particularly, to managing out of order packets in a network environment that are recorded in a temporal graph.

BACKGROUND

A temporal graph of a network stores graph elements, pertaining to network data flowing in the network, as vertices and as edges. The temporal graph stores all changes made to the network data as history and the temporal graph is capable of providing a snapshot of network data at any given point in time.

A temporal graph is ideal for storing data of a network such as a computer network. The temporal graph can be used to study over-time how data of the network is changing. For example, a temporal graph can be used to analyze usage in the computer network and to study traffic patterns in the computer network. The temporal graph can store different information such as information pertaining to users connected to the computer network, users logging out of the computer network, devices in the computer network to which users are connecting or disconnecting, devices in the computer network, applications run in the computer network, traffic and bandwidth handled by each network device in the computer network, etc.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present technology can include a system for storing data in a temporal graph. The system can include one or more processors and can store computer readable instructions for causing the system to perform a method of handling out of order data when it is received. For example the system can receive new data pertaining to a graph element in a temporal graph, the temporal graph comprising different types of graph elements including vertices and edges, for storing information of a computer network.

The system can determine that the temporal graph already stores second data for the graph element having a timestamp denoting a second time, wherein the new data was recorded at a first time that is the same or earlier than the second time, and can insert the new data into the temporal graph by recording data for the graph element in the temporal graph database with a timestamp for the new data denoting the first time and a next modification time for the new data that denotes the second time.

Further, the system can, prior to the insertion of the new data into the temporal graph, determine that the temporal graph already stores third data for the graph element having a timestamp for the third data denoting a third time and that has a next modification time for the third data that denotes the second time, wherein the first time that is associated with the new data is after the third time, but prior to the second time, and update the next modification time for the third data to denote the first time.

Further, when the system determines that the temporal graph already stores second data for the graph element having a timestamp denoting a second time the system can further determine that the new data is earlier than any timestamp associated with data for the graph element in the temporal graph.

Further, the system can receive a request to produce a snapshot of a portion of the temporal graph, wherein the request identifies one or more data elements and a specified time for which to produce the snapshot. In response, the system can search the temporal graph for all data that has a modification time less than or equal to the specified time coupled with a next modification time greater than the specified time.

The system can also receive a request to produce a current snapshot of a portion of the temporal graph, wherein the request identifies one or more data elements. In response, the system can search the temporal graph for all data that has a next modification time set to the maximum value.

Detailed Description

In a streaming data network, data that needs to be stored arrives as unbounded streams. In order to store the data in a temporal graph of the streaming data network, every data element of the data is assigned a timestamp. In such network, all the data elements of the data may not arrive in the increasing order of time. It is very common for the data elements to arrive in any temporal order.

In handling timestamped data elements in the streaming data network, it can be a problem to persist an out-of-order data element in the temporal graph. If the out-of-order data element is just a metric of a device at a particular point in time such as memory usage, bandwidth usage, service request count, client count, etc., then handling the out-of-order data element can be done using commonly practiced methods. In this case, handling the out-of-order data element is performed by adding one independent record to the temporal graph containing the device ID, timestamp, the metric type, and the metric data. Since the out-of-order data element is independent, i.e., the out-of-order data element is not related to any other existing record in the temporal graph, creating a record with the out-of-order data element in the temporal graph even if the out-of-order data element contains older timestamp, does not cause any problem.

However, if the out-of-order data element is part of a temporal graph such as a user logging into a network and establishing a connection with a network device, the user logging out, a network device being newly added to the network, a device disconnected from the network, a network service being made available, a service taken out, etc., then handling the out-of-order data element, can become problematic. In all the mentioned examples, the out-of-order data element is not an independent record, i.e., the out-of-order data element has a relationship with another record in the temporal graph. For example, a user logging in is an event but is also establishing a connection with a network device. If the user and the network device are stored as vertices in the temporal graph, then a relationship between the user and the network device, which is called a "connection," is stored as an edge connecting the user vertex and the network device vertex. Thus, if the user logging event happened at time t1 and the streaming data network is currently processing data belonging to t1+x, where x is a positive value, then the connection between the user and the network device is not only part of a snapshot of the temporal graph at t1 but also should be part of all snapshots of the temporal graph at times greater than time t1 such as t2, t3, t4, . . . , and t1+x, if the user is still logged on. Otherwise, the user logging event should be part of all snapshots of the temporal graph until the user logged out event is handled. If x is a very large number, then handling the out-of-order data element of time t1 should modify all snapshots of the temporal graph starting from t1 to t1+x.

In order to do a detailed analysis of the streaming data network, an implementation may store snapshots of the temporal graph for every required point in time. This approach may seem satisfactory for very small streaming networks. However, this approach quickly becomes ineffective for a practical implementation as the size of streaming data networks increases. The implementation that performs the detailed analysis of the streaming data network by storing all snapshots of the temporal graph for various points at any given time suffers from two main deficiencies.

The first deficiency associated with storing all snapshots of the temporal graph is if an out-of-order data element arrives, which is quite common in streaming data networks, then the temporal graph should not only modify a snapshot for the timestamp to which the out-of-order data element belongs but also all other stored snapshots that have timestamps greater than the timestamp of the out-of-order data element. This can be very time-consuming. Altering several snapshots for the out-of-order data element can render such a scheme completely non-practical as each snapshot can be linked to some many data points that the processing to handle the volume and complexity of the data in the temporal graph would be too great.

The second deficiency associated with storing all snapshots of the temporal graph for any given point in time is that it can cause duplication of records in the temporal graph as the out-of-order data element can be part of multiple snapshots of the temporal graph. This can cause space explosion, make the temporal graph unwieldy, and can result in excessive use of storage space.

The present technology addresses both the above two deficiencies associated with common practices, but in an efficient and elegant manner. A key insight is not to store out-of-order data in a snapshot but just store the out-of-order data as additional data linked to the temporal graph. By storing the out-of-order data in such a way, data duplication and excessive utilization of storage space are avoided. Even though the out-of-order data is not stored as a snapshot, a snapshot of the temporal graph for any given point in time can be materialized with O(1) time complexity—including a snapshot that includes the out-of-order data. According to the definition, O(1) time complexity means that the complexity is the same, regardless of the size of temporal graph, to retrieve any snapshot for any given point in time.

The present technology associates two timestamps with each data element. A first timestamp is called "ModificationTime" and second timestamp is called "NextModificationTime". Every vertex in the temporal graph that represents a data element has a unique ID. For the same data element (and vertex), the ID does not change. For example, for a given user the associated ID is the same. Therefore, if the user signs in, then signs out, and again signs in, every time the same ID is used for the user.

As an example, when a user signs in for the first time to a network a timestamp is assigned to the sign-in action of the user. A user vertex is created in a temporal graph of the network to represent the user. The user vertex is given a ModificationTime that matches timestamp of the sign-in action of the user, and the user vertex is given a NextModificationTime set to a very large value (hereinafter MAX_TIME) since the NextModificationTime is undefined at this moment the current data is written to the temporal graph. If a vertex is already present in the temporal graph of the network that represents the user, then there is no need to create a new vertex in the temporal graph.

A new vertex is also created in the temporal graph to represent a network device to which the user signs in. If a vertex representing the network device is already present in the temporal graph, then there is no need for creation of a new vertex in the temporal graph to represent the network device. After creation of the network device vertex in the temporal graph, the network device vertex is given a ModificationTime that is set to be the timestamp of the sign-in action of the user, and the NextModificationTime is set to be MAX_TIME.

After creating the network device vertex, an edge is also created in the temporal graph, connecting the user vertex and the network device vertex, ModificationTime of the edge is set to the timestamp of the sign-in action of the user and NextModificationTime of the edge is set to MAX_TIME.

If the user wants to sign out from the network, then only the sign-out action of the user must be handled as the vertices representing the user and the network device are already present in the temporal graph. To handle the sign-out action of the user, where a timestamp is assigned thereto, the edge connecting the user vertex and the network device vertex is fetched from the temporal graph, where NextModificationTime of the fetched edge is equal to MAX_TIME. Then, NextModificationTime of the fetched edge is updated to reflect the timestamp of the sign-out action of the user. Then a new edge is created in the temporal graph to connect the user vertex and the network device vertex, "Entry Status" of the created edge is set as "Deleted" (marking the sign-out action of the user), ModificationTime of the created edge is set to the timestamp of the sign-in action of the user, and NextModificationTime of the created edge is set to MAX_TIME.

If the user signs in to the network device for the second time, then there is no need to create a new user vertex and a new network device vertex in the temporal graph as the user vertex and the network device vertex are already present in the temporal graph.

The edge connecting the user vertex and the network device vertex is fetched, where NextModificationTime of the fetched edge is equal to MAX_TIME. This action retrieves the edge representing the sign-out action of the user (its "EntryStatus" field is marked as "Deleted"). NextModificationTime of the fetched edge is updated to the timestamp of the sign-out action of the user. Then a new edge connecting the user vertex and the network device vertex is created, ModificationTime of the created edge is set to the timestamp of the sign-in action of the user for the second time, and NextModificationTime of the created edge is set to MAX_TIME.

The above explanation describes an example of updating existing records in a temporal graph and creating new records, according to some embodiments of the present technology. A graph element can represent a non-temporal data element or a temporal data element in a temporal graph. Non-temporal data elements are data elements that do not change over time, such as a user or a network. In contrast, temporal data elements are data elements that can change over time. There can be only one representation for a graph element, representing a non-temporal data element, in a temporal graph. However, for a graph element, representing a temporal data element, the following actions are followed. First, NextModificationTime of the latest entry to the temporal graph is set to a timestamp of a current action and a new graph element representing the current action is created. Then, ModificationTime of the created graph element is set to the timestamp of the current action and NextModificationTime of the created graph element is set to MAX_TIME. The temporal data element can be sign-in/sign-out actions, link up/link down events, metric readings at frequent intervals such as memory usage, CPU usage, bandwidth usage, service request count, client count, etc.

To represent a temporal data element in a temporal graph of a network, an existing record of the temporal data element (if any) representing the latest version of the temporal data element is updated (NextModificationTime of the existing record is set to the timestamp of the temporal data element). Then a new record representing the temporal data element or the latest version of the temporal data element is created (NextModificationTime is set to MAX_TIME). Therefore, an extra computing cost is introduced through processes of (1) fetching the existing record of the temporal data element in the temporal graph and (2) updating the existing record before creating a new version of the temporal data in the temporal graph. However, benefits arise while reading data from the temporal graph, which is extremely important for doing real-time data analysis of the temporal graph. Benefits outclass the introduced cost of the above processes.

According to some embodiments of this disclosure, reading a temporal graph is extremely simple and extremely fast. Fetching of the current snapshot can be done by using the following query:
SELECT * from DB WHERE NextModificationTime="MAX_TIME"

Fetching of snapshot for any given point in time, say "t", can be retrieved using the following query:
SELECT * from DB WHERE ModificationTime<="t" and NextModificationTime>"t"

Thus, a snapshot for any given point in time is materialized quickly without actually storing the snapshots. Hence the two main deficiencies associated with commonly used methods that store snapshots of the temporal graph at any given point in time are completely avoided. The two problems of out-of-order processing of data and excessive storage space requirement due to data duplication as the same data element could be part of multiple snapshots.

When a temporal data element is processed out-of-order by the present technology, the temporal data element not only instantly becomes part of the snapshot of timestamp of the temporal data element, but also instantly becomes part of all snapshots whose timestamps are greater.

Since snapshots are not explicitly stored, there is no data duplication, which leads to optimal usage of storage space. Read operations execute at O(1) time complexity.

In accordance to some embodiments of the present technology, every representation of a data element stored in a temporal graph uses not just one timestamp but uses two timestamps: ModificationTime and NextModificationTime.

The latest snapshot of the temporal graph could be retrieved by fetching all representation of data elements whose NextModificationTime fields equals MAX_TIME.

Snapshot for any specified time "t" could be retrieved by fetching all elements in the temporal graph whose ModificationTime is less than or equal to "t" and NextModificationTime is greater than "t". This captures both data modified at the specified time "t" and data that was modified prior to the specified time "t", but that was not updated until after the specified time "t" and is therefore data belonging to the requested snapshot.

If the data element arrives, for example represented by a vertex that contains a very old timestamp (out-of-order), it is not a problem if that data element is the latest version of that particular vertex. That means if a previous version of the vertex already exists in the temporal graph and the latest version of the vertex existing in the temporal graph contains a timestamp that is less than the timestamp of the data element, then there is no problem and all the explanation provided above are enough.

However, if the temporal graph already contains one or more representations of the data element that are much newer than the data element, then this out-of-order problem has to be specifically handled which is explained in detail below.

Figure 1:
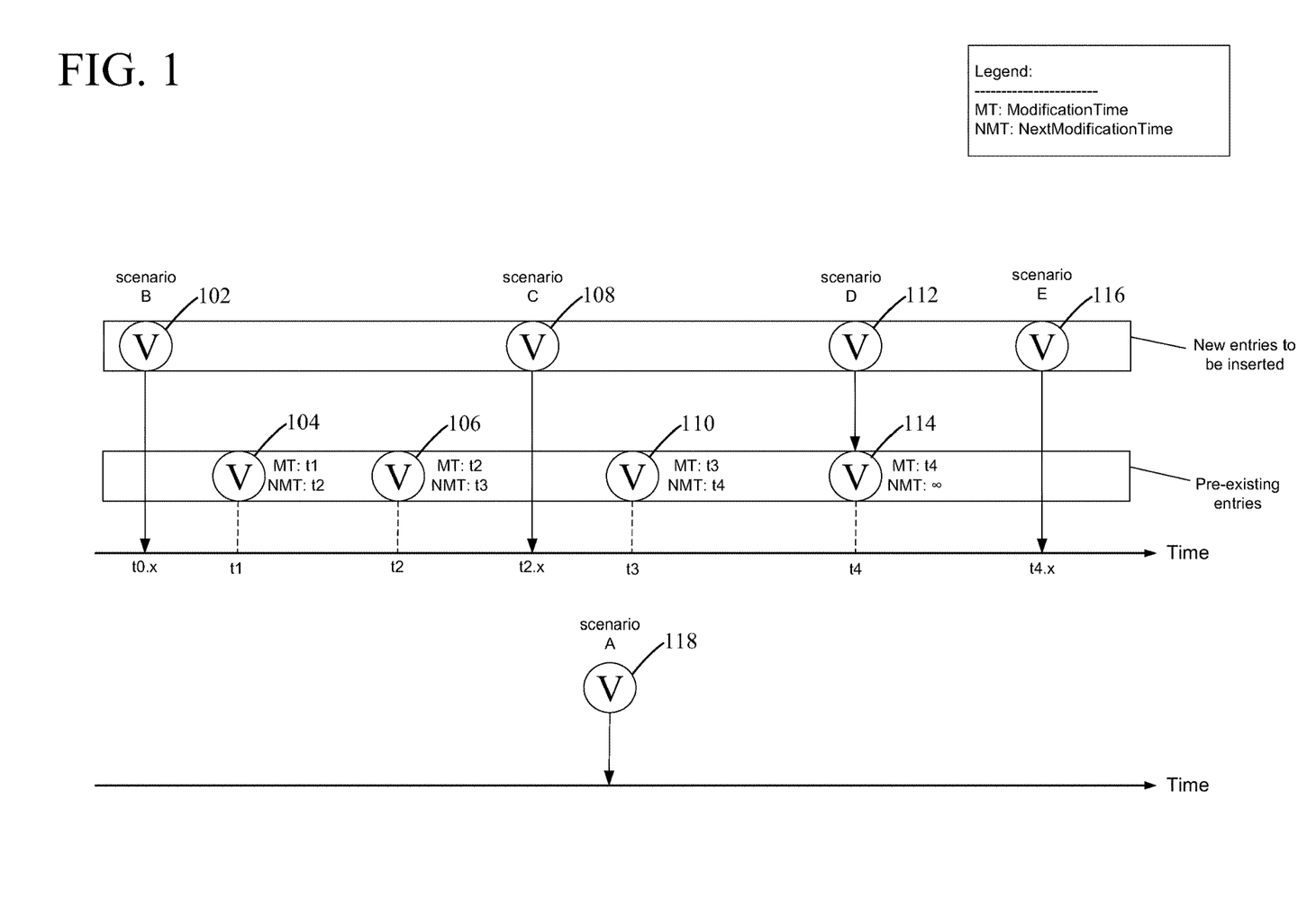
FIG. 1 illustrates example embodiments of insertion scenarios for new data in accordance with some aspects of present technology.

FIG. 1 shows an example for possible scenarios for inserting new data element in a temporal graph.

FIG. 1 illustrates different scenarios for pre-existing representations in the form of vertex or a data element at different timestamps. FIG. 1 shows vertex 104 at a time t1 that has ModificationTime and NextModificationTime of t1 and t2, respectively. The vertex 106 at time t2 has ModificationTime and NextModificationTime of t2 and t3, respectively. Also in FIG. 1, the vertex 110 at time t3 has ModificationTime and NextModificationTime of t3 and t4, respectively, and the vertex 114 at time t4 has ModificationTime and NextModificationTime of t4 and co, respectively.

FIG. 1 also illustrates different scenarios for insertion of a new data element in a temporal graph. A vertex 102 represents scenario B, a vertex 108 represents scenario C, a vertex 112 represents scenario D, a vertex 116 represents scenario E, and a vertex 118 represents scenario A. Description of scenarios A, B, C, D, and E are as follows.

As stated above and according to some aspects of the present technology, an out-of-order data packet needs to be handled effectively in a streaming data network. By using the below query, any new data element can be checked to determine if an existing version of the vertex already exists in the temporal graph, and whether the new data element is arriving out-of-order from data already existing in the temporal graph. Assume that a new data element with timestamp t2, which should be represented by a vertex in the temporal graph, is received. At least one processor responsible for writing new data to the temporal graph determine a result to the following query:
SELECT * from DB
WHERE ID='VertexId' AND NextModificationTime>'t2'
ORDER BY NextModificationTime ASCENDING
LIMIT 1

The above query can yield five different kinds of results (scenarios A, B, C, D, and E) that are described as follows and with referring to FIG. 1.

According to a first scenario, the above query retrieves no existing record of the new data element in the temporal graph. This indicates that no previous record or later record exists for the new data element, and the new data element is the very first version and can be inserted into the temporal graph normally (scenario A represented by vertex 118 in FIG. 1).

According to a second scenario, the above query retrieves an existing record, where ModificationTime of the existing record is t1, which is less than t2, and NextModificationTime of the existing record is MAX_TIME. This result shows that the new data element is not arriving out-of-order and can be processed in order. In this case, the existing record is updated such that NextModificationTime of the existing record is updated to t2 and ModificationTime of the existing record is kept to be t1. Also, a new record with the new data element is created in the temporal graph to represent the new data element, ModificationTime of the new record is set to t2, and NextModificationTime of the new record is set to MAX_TIME (scenario E represented by vertex 116 in FIG. 1).

According to a third scenario, the above query retrieves an existing record, where ModificationTime of the existing record is t2, which is the same as timestamp t2 of the new data. This happens if the same data is being reported more than once or deliberately the existing record is being updated. As per the system-wide setting, the new data element can be ignored by treating the new data element as duplicate or information of the new data element can be merged with the existing record and the existing record can be updated. The important thing to note in this case is that both ModificationTime and NextModificationTime fields of the existing record are not touched. However, if data of the existing record and the new data element are the same without any change, then the new data element can be ignored (scenario D represented by vertex 112 in FIG. 1).

According to a fourth scenario, the above query retrieves an existing record, where ModificationTime of the existing record is t1, which is less than the new data's timestamp t2 and NextModificationTime of the existing record is t3, which is greater than the new data's timestamp t2. This is the most complex case of all the scenario discussed herein and highlights the classic handling out-of-order data problem. In this case, record for t1 exists and records for t3, t4, t5 and so on can also exist. This means that the temporal graph contains both previous records as well as later records of the new data element. For the existing record, NextModificationTime is updated from t3 to t2 while ModificationTime of the existing record is kept to be t1. Also, a new record with the new data element is created, where ModificationTime of the new record is set to t2 and NextModificationTime of the new record is set to t3. It is to be noted that t3 is obtained from the existing record. Thus, the new data element is stitched properly in between the already existing records of time t1 and t2. It is immaterial if it is just one later version t3 exists or many later versions such t3, t4, t5 and so on exist (scenario C represented by vertex 108 in FIG. 1).

According to a fifth scenario, the above query retrieves an existing record, where ModificationTime of the existing record is t3, which is greater than timestamp of the new data element: t2. In this case, value of NextModificationTime of the existing record is irrelevant. This indicates that the temporal graph does not contain any previous records of the new data element. However, the temporal graph contains one or more newer records of the new data element and the new data element is an earlier version of that needs to be processed out-of-order. In this case, there exists no previous record to be updated. A new record with the new data element is created, where ModificationTime of the new record is set to t2 and NextModificationTime of the new record is set to t3, which is the value obtained from ModificationTime of the existing record (scenario B represented by vertex 102 in FIG. 1).

Therefore, during insertion time into the temporal graph, a query is made to process every new data element, an existing record is updated (scenarios 2, 3, 4 mentioned above) or no existing record is updated (scenarios 1 and 5 mentioned above) and a new record with the new data element is created and inserted in the temporal graph.

Figure 2:
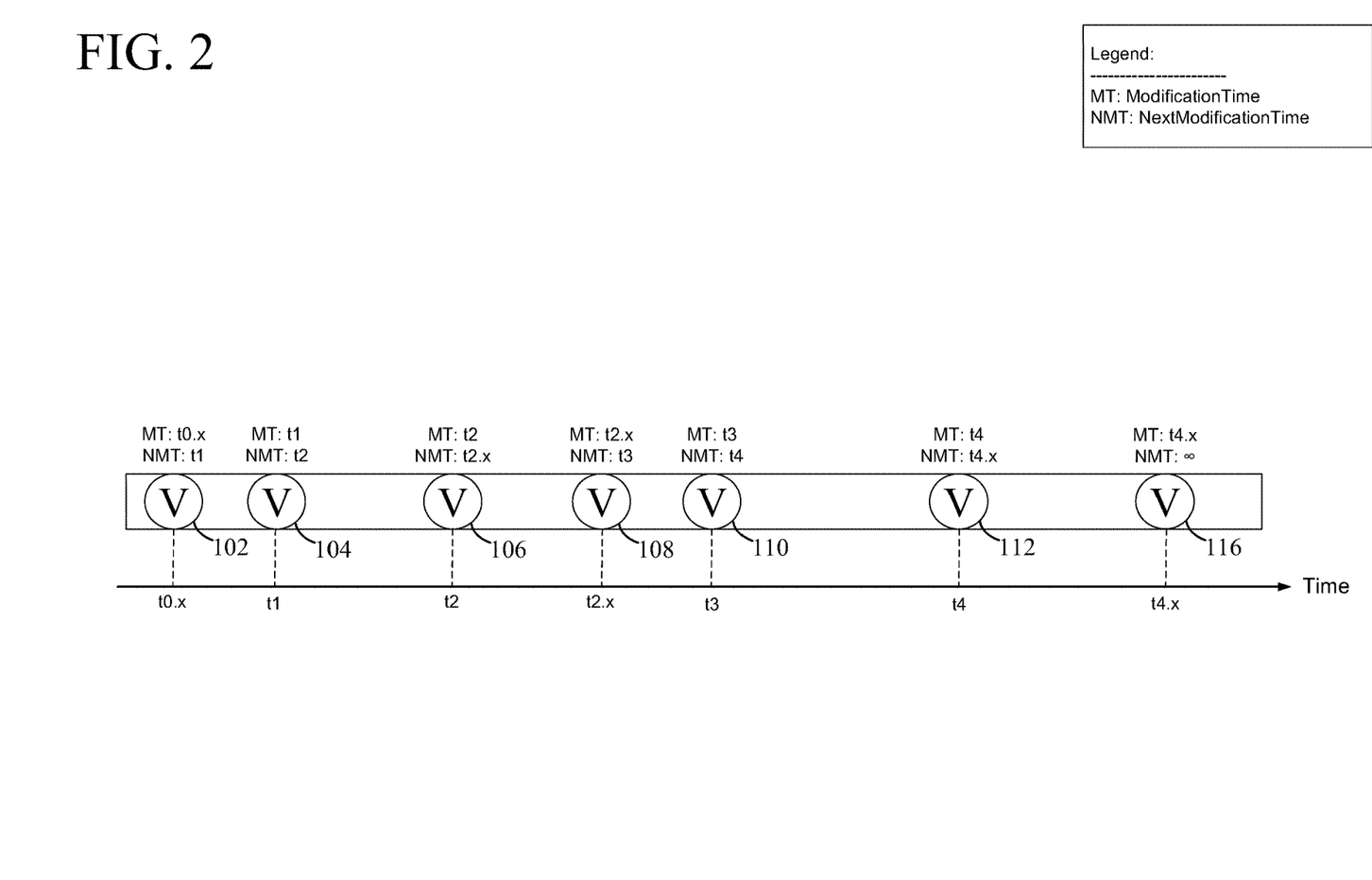
FIG. 2 illustrates an example embodiment for a completed insertion of new data in accordance with some aspects of present technology.

FIG. 2 shows completed insertion of a new data element into a temporal graph. In FIG. 2, vertex 102, representing scenario B in FIG. 1, has been placed in the temporal graph, where ModificationTime and NextModificationTime of vertex 102 are set to t0.x and t1, respectively. Vertex 104 that was shown in FIG. 1, is also illustrated in FIG. 2. Also, vertex 106 that was shown in FIG. 1, has been updated in FIG. 2, where ModificationTime and NextModificationTime of vertex 106 in FIG. 2 are t2 and t2.x, respectively.

FIG. 2 shows vertex 106 of FIG. 1 but with updated timestamps, where ModificationTime and NextModificationTime of vertex 106 in FIG. 2 have been set to t2 and t2.x, respectively. Vertex 108 that denotes scenario C in FIG. 1 has been inserted in the temporal graph in FIG. 2, where ModificationTime and NextModificationTime of vertex 108 in FIG. 2 have been set to t2.x and t3, respectively. FIG. 2 also illustrates vertex 110 of FIG. 1 with ModificationTime and NextModificationTime of t3 and t4, respectively. Vertex 112 that denotes scenario D in FIG. 1 has been inserted in the temporal graph in FIG. 2, where ModificationTime and NextModificationTime of vertex 112 in FIG. 2 have been set to t4 and t4.x, respectively. Vertex 116 in FIG. 1 that denotes scenario E has been added to FIG. 2, where ModificationTime and NextModificationTime of vertex 116 are listed as t4.x and ∞, respectively.

In some embodiments, the proposed technology allows for maintaining changes made to a temporal graph, retrieving a snapshot of the entire temporal graph given any point in time using O(1) time complexity, efficiently using storage space by not having to store any snapshot explicitly, and efficiently and correctly handling out-of-order arrival of a new data element in a streaming data network.

Figure 3:
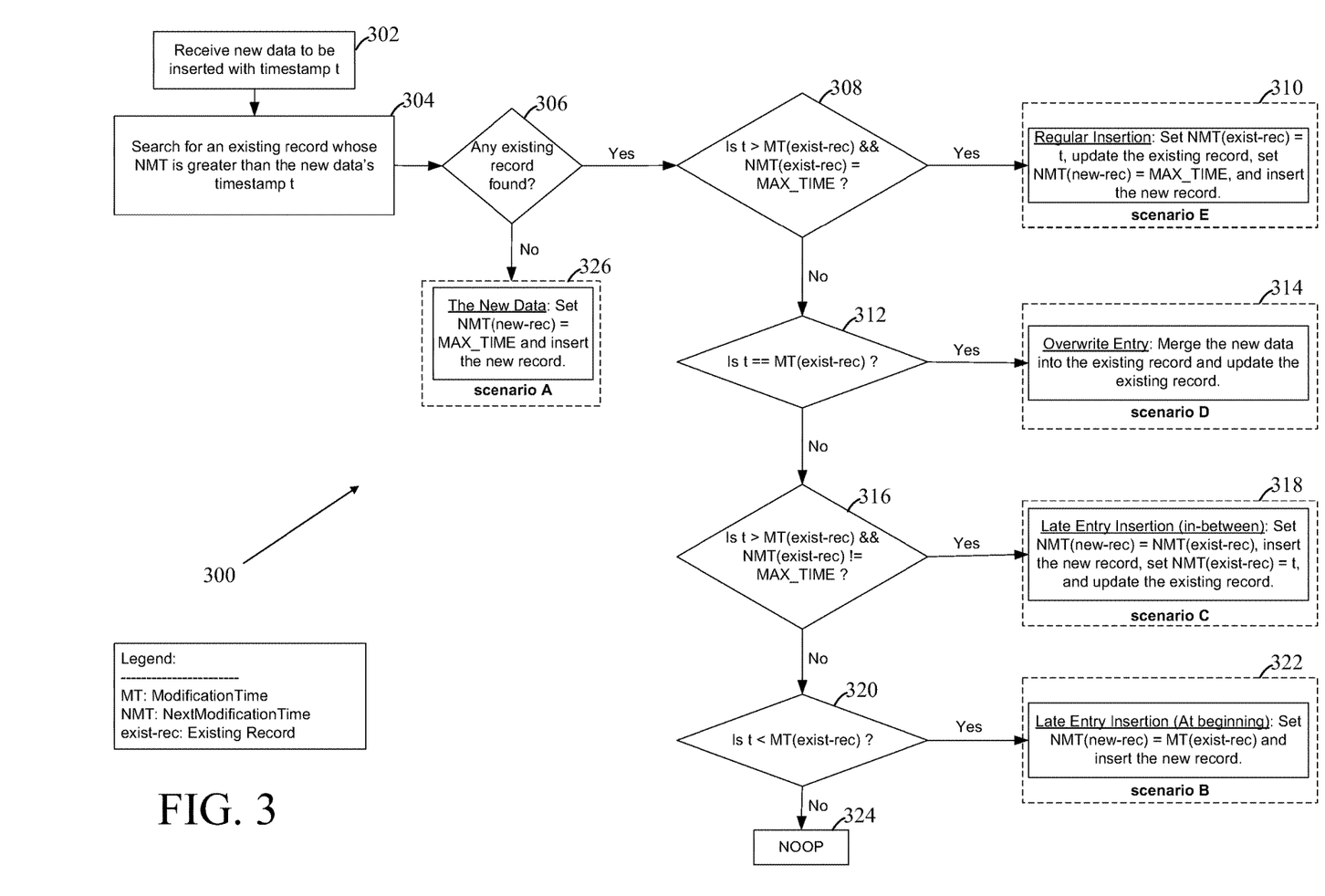
FIG. 3 illustrates an example method embodiment for inserting new data in a temporal graph in accordance with some aspects of present technology.

FIG. 3 is a flowchart depicting a method 300, run by a computing system having at least one processor for carrying out the steps of the method for inserting a new data element in a temporal graph. The method 300 is described with respect to FIG. 1, according to some embodiments of the present technology. While reference is made to multiple figures, no limitation from one figure should be imputed to other figures. No limitations is intended except as otherwise indicated in the appended claims.

The method 300 starts from step 302, where the computing system receives (302) the new data element with timestamp t. Then the computing system searches (304) for an existing record of the new data element in the temporal graph, where NextModificationTime of the existing record is greater than timestamp t of the new data element. The computing system checks (306) to see if it finds any existing record of the new data element in the temporal graph. If the computing system does not find any existing record of the new data element, which means that there is neither previous record nor later record of the new data element in the temporal graph, the computing system creates (326) a new record with the new data element in the temporal graph, sets NextModificationTime of the new record equal to MAX_TIME, and inserts the new record. Step 326 in FIG. 3 corresponds to scenario A 118 in FIG. 1.

If the computing system finds an existing record in the temporal graph, the computing system checks (308) to see if both of these criteria are simultaneously satisfied: timestamp t of the new data element is greater than ModificationTime of the existing record and NextModificationTime of the existing record is set to MAX_TIME. If both criteria are simultaneously satisfied, then the computing system creates a new record with the new data element in the temporal graph, sets (310) NextModificationTime of the existing record to timestamp t of the new data element, updates the existing record, sets NextModificationTime of the new record equal to MAX_TIME, and inserts the new record in the temporal graph. Step 310 in FIG. 3 corresponds to scenario E 116 in FIG. 1.

If the computing system finds that the two conditions in step 308 are not satisfied simultaneously, the computing system checks (312) to see if timestamp t of the new data element is equal to ModificationTime of the existing record in the temporal graph. If timestamp t of the new data is equal to ModificationTime of the existing record in the temporal graph, the computing system merges the new data element into the existing record. The computing system makes no change in ModificationTime and NextModificationTime of the existing record. Step 314 in FIG. 3 corresponds to scenario D 112 in FIG. 1.

At step 312, if the computing system finds that timestamp t of the new data element is not equal to ModificationTime of the existing record, the computing system checks (316) to see if timestamp t of the new data element is greater than ModificationTime of the existing record and NextModificationTime of the existing record is not equal to MAX_TIME. If the computing system finds that timestamp t of the new data element is greater than ModificationTime of the existing record and NextModificationTime of the existing record is not equal to MAX_TIME, then the computing system creates a new record with the new data element in the temporal graph, sets (318) NextModificationTime of the new record equal to NextModificationTime of the existing record, inserts the new record in the temporal graph, sets NextModificationTime of the existing record equal to timestamp t, and updates the existing record. Step 318 in FIG. 3 corresponds to scenario C 108 in FIG. 1.

At step 316, if the computing system finds that two conditions: (1) timestamp t of the new data element is greater than ModificationTime of the existing record and (2) NextModificationTime of the existing record is not equal to MAX_TIME are not concurrently satisfied, the computing system checks (320) to see if timestamp t of the new data element is lesser than the ModificationTime of the existing record. If the timestamp t of the new data element is lesser than the ModificationTime of the existing record, then the computing system creates a new record with the new data element in the temporal graph, sets (322) NextModificationTime of the new record equal to ModificationTime of the existing record and inserts the new record. Step 322 in FIG. 3 corresponds to scenario B 102 in FIG. 1.

At step 320, if the computing system finds that timestamp t of the new data element is not lesser than the ModificationTime of the existing record, the computing system stops (324) and does not do any further operation.

Figure 4:
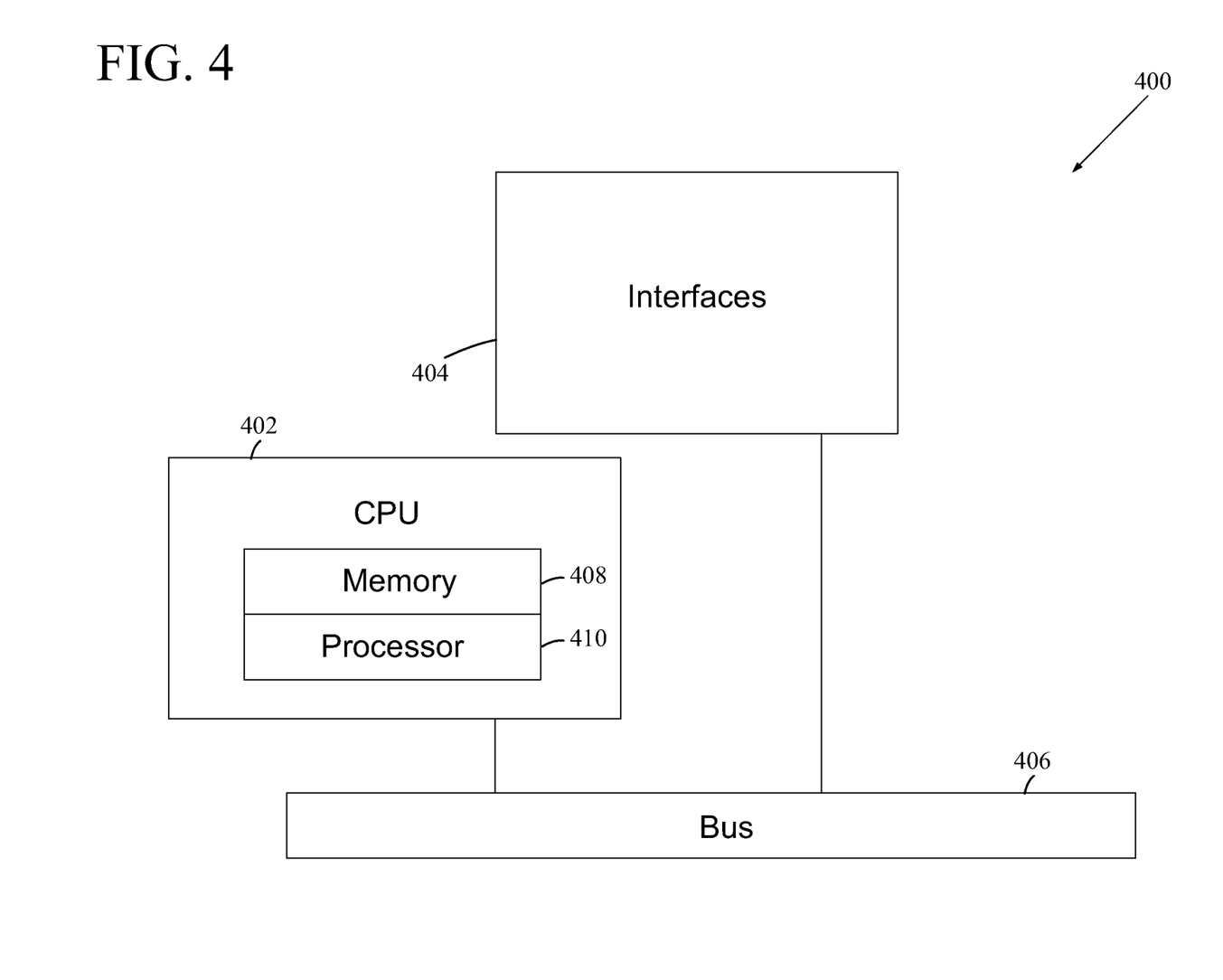
FIG. 4 illustrates an example of a networking device in accordance with some aspects of present technology.

FIG. 4 illustrates an example a network device 400 (e.g., switch, router, network appliance, etc.). The network device 400 can include a master central processing unit (CPU) 402, interfaces 404, and a bus 406 (e.g., a PCI bus). When acting under the control of appropriate software or firmware, the CPU 402 can be responsible for executing packet management, error detection, and/or routing functions. The CPU 402 preferably accomplishes all these functions under the control of software including an operating system and any appropriate applications software. The CPU 402 may include one or more processors 408 such as a processor from the Motorola family of microprocessors or the MIPS family of microprocessors. In an alternative embodiment, the processor 408 can be specially designed hardware for controlling the operations of the network device 400. In an embodiment, a memory 410 (such as non-volatile RAM and/or ROM) can also form part of the CPU 402. However, there are many different ways in which memory could be coupled to the system.

The interfaces 404 can be provided as interface cards (sometimes referred to as line cards). The interfaces 404 can control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 404 may include ports appropriate for communication with the appropriate media. In some cases, the interfaces 404 may also include an independent processor and, in some instances, volatile RAM. The independent processors may control communication intensive tasks such as packet switching, media control, and management. By providing separate processors for the communication intensive tasks, the interfaces 404 may allow the CPU 402 to efficiently perform routing computations, network diagnostics, security functions, and so forth.

Although the system shown in FIG. 4 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 400.

Regardless of the network device's configuration, it may employ one or more memories or memory modules (including the memory 410) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 5:
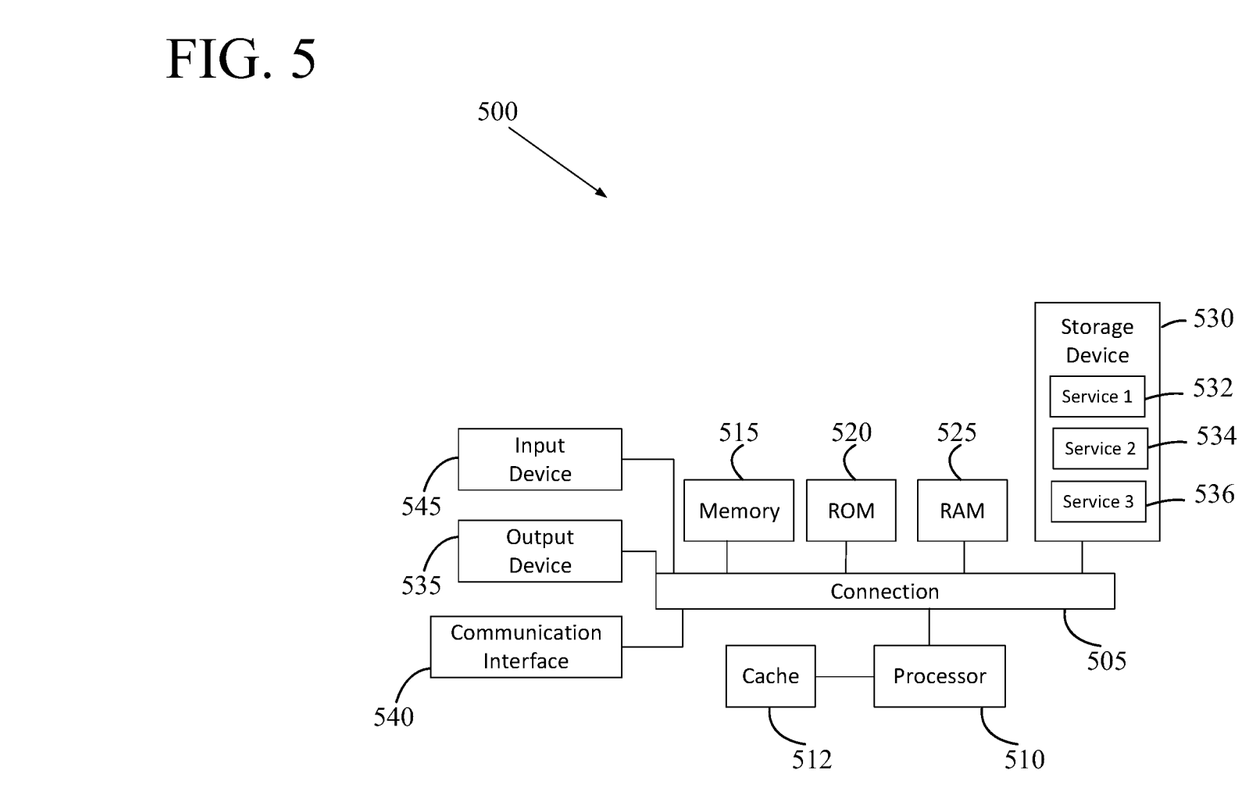
FIG. 5 illustrates an example of a computing system in accordance with some aspects of present technology.

FIG. 5 shows an example of a computing system architecture 500, which can be for example any computing device making up a controller, or a wireless access point or any component thereof in which the components of the system are in communication with each other using a connection 505. The connection 505 can be a physical connection via a bus, or a direct connection into a processor 510, such as in a chipset architecture. The connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and a connection 505 that couples various system components including system memory 515, such as read only memory (ROM) 520 and random access memory (RAM) 525 to processor 510. The computing system 500 can include a cache of high-speed memory 512 connected directly with, in close proximity to, or integrated as part of the processor 510.

The processor 510 can include any general purpose processor and a hardware service or a software service, such as services 532, 534, and 536 stored in a storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction, the computing system 500 includes an input device 545, which can represent any number of input mechanisms, such as a microphone for speech, a touch-sensitive screen for gesture or graphical input, keyboard, mouse, motion input, speech, etc. The computing system 500 can also include an output device 535, which can be one or more of a number of output mechanisms known to those of skill in the art. In some instances, multimodal systems can enable a user to provide multiple types of input/output to communicate with the computing system 500. The computing system 500 can include a communications interface 540, which can generally govern and manage the user input and system output. There is no restriction on operating on any particular hardware arrangement and therefore the basic features here may easily be substituted for improved hardware or firmware arrangements as they are developed.

A storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as the processor 510, the connection 505, the output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, which when executed by at least one processor, causes the at least one processor to:
   receive new data pertaining to a graph element in a temporal graph, the temporal graph comprising different types of graph elements including vertices and edges, for storing information of a computer network;
   determine that the temporal graph already stores existing data for the graph element having a next modification time (NMT) being greater than a timestamp of the new data; and
   insert the new data into the temporal graph.

2. The non-transitory computer readable medium of claim 1, further comprising instructions which when executed by the at least one processor, causes the at least one processor to:
   in response to the timestamp being greater than a modification time (MT) of the existing data and the NMT is set to max time, create a new record to insert the new data, set the NMT of the existing data to the timestamp, and set an NMT of the new record to the max time.

3. The non-transitory computer readable medium of claim 1, further comprising instructions which when executed by the at least one processor, causes the at least one processor to:
   in response to the timestamp being equal to a modification time (MT) of the existing data, insert the new data by merging the new data into the existing data.

4. The non-transitory computer readable medium of claim 1, further comprising instructions which when executed by the at least one processor, causes the at least one processor to:
   in response to the timestamp being greater than a modification time (MT) of the existing data and the NMT is not set to max time, create a new record to insert the new data, set an NMT of the new record to the NMT of the existing data and set the NMT of the existing data to the timestamp.

5. The non-transitory computer readable medium of claim 1, further comprising instructions which when executed by the at least one processor, causes the at least one processor to:
   in response to the timestamp being less than a modification time (MT) of the existing data, create a new record to insert the new data and set an NMT of the new record to the MT of the existing data.

6. The non-transitory computer readable medium of claim 1, further comprising instructions which when executed by the at least one processor, causes the at least one processor to:
   determine that the temporal graph does not store the existing data for the graph element having the NMT being greater than the timestamp of the new data; and
   create a new record to insert the new data and set an NMT of the new record to max time.

7. The non-transitory computer readable medium of claim 1, wherein each of the vertices represent at least one of interconnecting devices in the computer network or metric elements representing operational information related to the interconnecting devices.

8. The non-transitory computer readable medium of claim 1, wherein each of the edges represent a relationship between interconnecting devices in the computer network.

9. A system comprising:
at least one processor;
a memory with instructions stored thereon, which when executed by the at least one processor, causes the at least one processor to:
receive new data pertaining to a graph element in a temporal graph, the temporal graph comprising different types of graph elements including vertices and edges, for storing information of a computer network;
determine that the temporal graph already stores existing data for the graph element having a next modification time (NMT) being greater than a timestamp of the new data; and
insert the new data into the temporal graph.

10. The system of claim 9, further comprising instructions which when executed by the at least one processor, causes the at least one processor to:
in response to the timestamp being greater than a modification time (MT) of the existing data and the NMT is set to max time, create a new record to insert the new data, set the NMT of the existing data to the timestamp, and set an NMT of the new record to the max time.

11. The system of claim 9, further comprising instructions which when executed by the at least one processor, causes the at least one processor to:
in response to the timestamp being equal to a modification time (MT) of the existing data, insert the new data by merging the new data into the existing data.

12. The system of claim 9, further comprising instructions which when executed by the at least one processor, causes the at least one processor to:
in response to the timestamp being greater than a modification time (MT) of the existing data and the NMT is not set to max time, create a new record to insert the new data, set an NMT of the new record to the NMT of the existing data and set the NMT of the existing data to the timestamp.

13. The system of claim 9, further comprising instructions which when executed by the at least one processor, causes the at least one processor to:
in response to the timestamp being less than a modification time (MT) of the existing data, create a new record to insert the new data and set an NMT of the new record to the MT of the existing data.

14. The system of claim 9, further comprising instructions which when executed by the at least one processor, causes the at least one processor to:
determine that the temporal graph does not store the existing data for the graph element having the NMT being greater than the timestamp of the new data; and
create a new record to insert the new data and set an NMT of the new record to max time.

15. The system of claim 9, wherein each of the vertices represent at least one of interconnecting devices in the computer network or metric elements representing operational information related to the interconnecting devices.

16. The system of claim 9, wherein each of the edges represent a relationship between interconnecting devices in the computer network.

17. A method comprising:
receiving new data pertaining to a graph element in a temporal graph, the temporal graph comprising different types of graph elements including vertices and edges, for storing information of a computer network;
determining that the temporal graph already stores existing data for the graph element having a next modification time (NMT) being greater than a timestamp of the new data; and
insert the new data into the temporal graph.

18. The method of claim 17, further comprising:
in response to the timestamp being greater than a modification time (MT) of the existing data and the NMT is set to max time, creating a new record to insert the new data, set the NMT of the existing data to the timestamp, and set an NMT of the new record to the max time.

19. The method of claim 17, further comprising:
in response to the timestamp being equal to a modification time (MT) of the existing data, inserting the new data by merging the new data into the existing data.

20. The method of claim 17, further comprising:
in response to the timestamp being greater than a modification time (MT) of the existing data and the NMT is not set to max time, creating a new record to insert the new data, set an NMT of the new record to the NMT of the existing data and set the NMT of the existing data to the timestamp.

* * * * *